(12) United States Patent
Allen et al.

(10) Patent No.: US 8,087,192 B2
(45) Date of Patent: Jan. 3, 2012

(54) FLAT PANEL DISPLAY MOUNT AND METHODS OF MAKING THE SAME

(75) Inventors: Miles Allen, Las Vegas, NV (US); Dan Beza, Henderson, NV (US); Rick Juleen, Jr., Henderson, NV (US)

(73) Assignee: Young Electric Sign Company, Salt Lake City, UT (US)

( * ) Notice: Subject to any disclaimer, the term of this patent is extended or adjusted under 35 U.S.C. 154(b) by 199 days.

(21) Appl. No.: 12/166,850

(22) Filed: Jul. 2, 2008

(65) Prior Publication Data
US 2010/0000136 A1 Jan. 7, 2010

(51) Int. Cl.
*G09F 15/00* (2006.01)

(52) U.S. Cl. .................. 40/606.15; 248/284.1

(58) Field of Classification Search ............... 40/606.15, 40/611.01; 248/282.1, 220.21, 284.1
See application file for complete search history.

(56) References Cited

U.S. PATENT DOCUMENTS

| | | | |
|---|---|---|---|
| 3,550,892 A * | 12/1970 | Propst | 248/282.1 |
| 4,071,216 A * | 1/1978 | Einhorn | 248/282.1 |
| 4,775,313 A * | 10/1988 | Diloia | 425/458 |
| 5,584,546 A * | 12/1996 | Gurin et al. | 312/200 |
| 6,152,410 A * | 11/2000 | Mark | 248/220.1 |
| 6,923,413 B2 * | 8/2005 | Dozier | 248/294.1 |
| 7,028,961 B1 | 4/2006 | Dittmer et al. | |
| 7,210,662 B2 * | 5/2007 | Liou et al | 248/282.1 |
| D558,560 S | 1/2008 | Ciungan | |
| 7,448,584 B2 * | 11/2008 | Chen et al. | 248/278.1 |
| 7,472,971 B2 * | 1/2009 | Schmieder et al. | 312/223.3 |
| 7,487,943 B1 * | 2/2009 | Gillespie | 248/282.1 |
| 2004/0159757 A1 | 8/2004 | Pfister | |
| 2004/0262474 A1 * | 12/2004 | Boks et al. | 248/276.1 |
| 2007/0252919 A1 * | 11/2007 | McGreevy | 348/825 |

OTHER PUBLICATIONS

LCD TV Wall Mount, an LCD TV Mount for LCD and Plasma TVs, Ergo in Demand web page, http://www.ergoindemand.com/lcd-tv-wall-mount.htm, printed Jul. 2, 2008, 2 pages.

* cited by examiner

*Primary Examiner* — Joanne Silbermann
*Assistant Examiner* — Christopher e Veraa
(74) *Attorney, Agent, or Firm* — TraskBritt

(57) ABSTRACT

Flat panel display mounts configured to rotate about a vertical axis and at least substantially maintain rigidity about a horizontal axis comprise a mounting member configured to receive a flat panel display thereon, and an arm member attached to the mounting member. The arm member includes at least one hinge on at least one of a first and second coupling members. Methods of forming a flat panel display mount are disclosed. A modular sign including a housing, at least one sign panel, and a flat panel display mount is also disclosed.

31 Claims, 4 Drawing Sheets

FLAT PANEL DISPLAY MOUNT AND METHODS OF MAKING THE SAME

TECHNICAL FIELD

Embodiments of the present invention relate generally to mounting devices, and, more particularly, to a mounting device for a flat panel display capable of quick change and alignment.

BACKGROUND

Flat panel display mounts are conventionally used to mount flat panel displays, such as computer monitors and televisions, to a wall or other structure. Some display mounts are configured to enable the display to move relative to the wall or other structure on which it is mounted. These movable mounts conventionally employ a mounting arm that is anchored into the wall or structure on one end and to the flat panel display at the other end. The mounting arm is conventionally configured to move the flat panel display in multiple directions including combinations of vertically and horizontally, as well as rotating the flat panel display about a horizontal axis to adjust the angle of the screen in relation to a vertical axis or a horizontal axis.

In these movable mounts, the many degrees of freedom can create a structure that is not very rigid and can introduce significant deflections in multiple directions when the display is adjusted to various positions within the range of movement.

There is a need for a movable mount that enables movement of a flat panel display to provide access to the back side of the flat panel as well as other components and/or devices positioned behind the flat panel while simultaneously preventing unwanted and undesirable deflection of the flat panel display.

BRIEF SUMMARY

Various embodiments of the present invention are directed toward a flat panel display mount. In some embodiments, the flat panel display mount may comprise a mounting member configured to receive a flat panel display thereon at a fixed angle with a vertical plane. The mounting member may comprise a mounting surface on one side and an attachment surface on an opposing side. An arm member comprising a coupling member on each end of a longitudinally extending support member, may be attached to the mounting member. At least one hinge may be attached to a coupling member and configured to rotate the arm member about a vertical axis while maintaining the mounting member at least substantially rigid about a horizontal axis.

In other embodiments, the present invention is directed to a modular sign. Embodiments of the modular sign may comprise a housing configured to receive at least one flat panel display within at least a portion thereof. At least one sign panel may be attached to the housing and at least one flat panel display mount may be attached to the housing. The at least one flat panel display mount may comprise a mounting member configured to receive a flat panel display thereon. An arm member comprising a coupling member on each end of a longitudinally extending support member may be attached between the mounting member and the housing. The attachment between the housing and the arm member may comprise at least one hinge configured to rotate the arm member about a vertical axis.

In yet other embodiments, the present invention is directed to a method of forming a flat panel display mount. In at least some embodiments, the method comprises forming a mounting member configured to receive a flat panel display thereon at a fixed angle. An arm member may be formed comprising a coupling member on each end of a longitudinally extending support member, and one of the coupling members may be attached to the mounting member. At least one hinge may be attached to at least the coupling member on an opposing end of the longitudinally extending support member from the coupling member attached to the mounting member. The at least one hinge may be configured to rotate the arm member about a vertical axis and maintain the mounting member rigid about a horizontal axis.

DETAILED DESCRIPTION

The illustrations presented herein are, in some instances, not actual views of any particular flat panel display mount, or sign, but are merely idealized representations which are employed to describe the present invention. Additionally, elements common between figures may retain the same numerical designation.

Various embodiments of the present invention include embodiments of a flat panel display mount and, specifically, a flat panel display mount for providing access to the back side of the flat panel as well as other components and/or devices positioned behind the flat panel while simultaneously preventing unwanted and undesirable deflection of the flat panel display.

Figure 1:
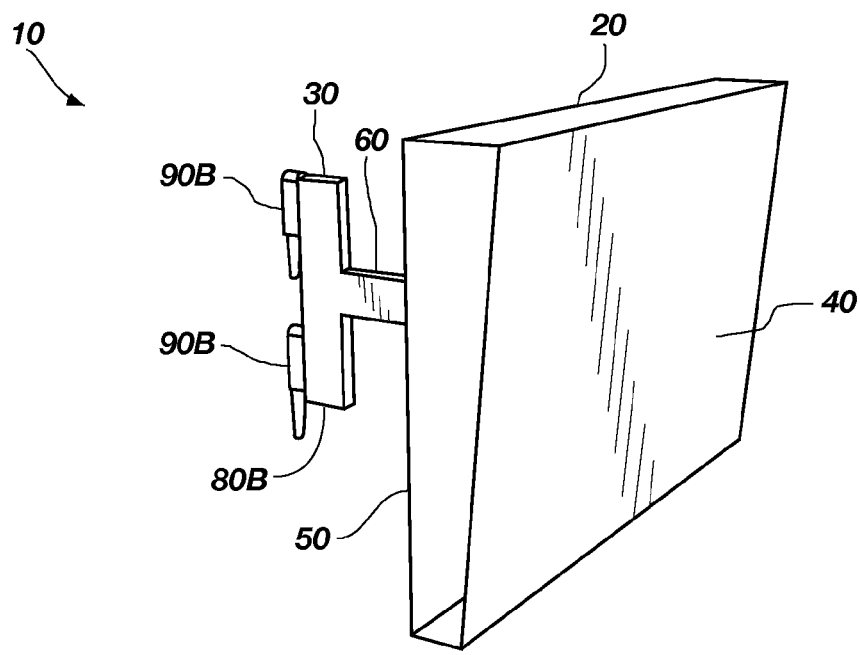
FIG. 1 illustrates an isometric view of a flat panel display mount according to an embodiment of the present invention.
Figure 2:
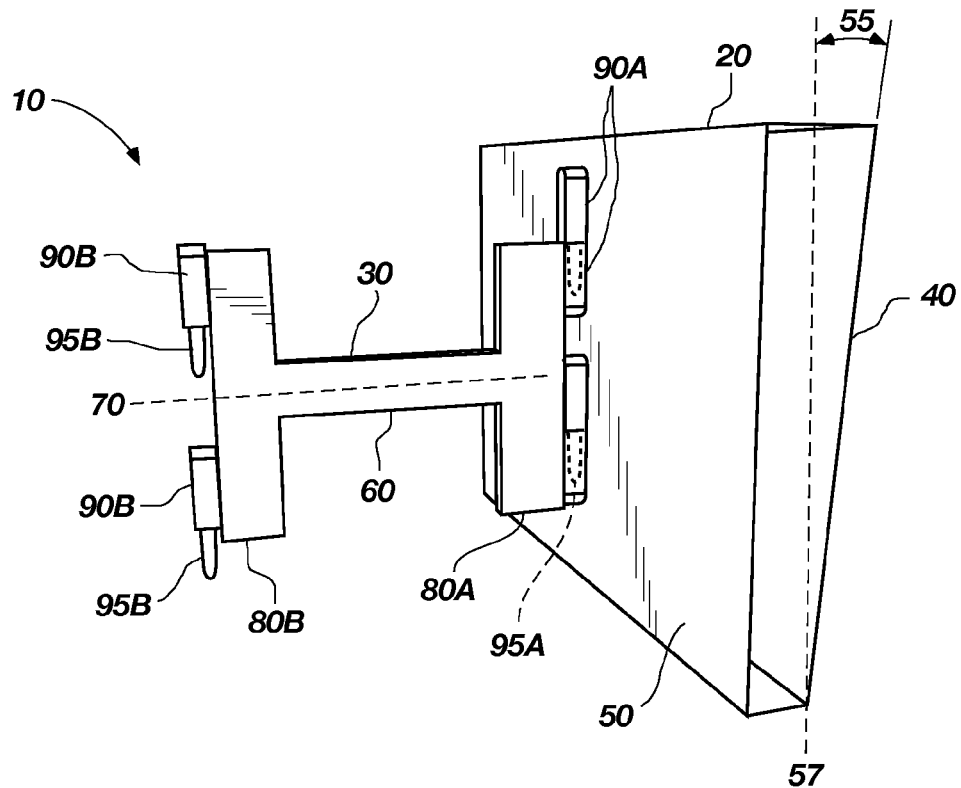
FIG. 2 illustrates an isometric view of a flat panel display mount according to an embodiment of the present invention.

FIGS. 1 and 2 illustrate isometric views of a flat panel display mount 10 according to an embodiment of the present invention. The flat panel display mount 10 may comprise a mounting member 20 configured to receive a flat panel display (not shown) thereon and an arm member 30 coupled to the mounting member 20. The mounting member 20 may comprise a mounting surface 40 on one side of the mounting member 20 and an attachment surface 50 on an opposing side of the mounting member 20. The mounting surface 40 may extend at an angle 55 from a vertical plane 57 so that a flat panel display mounted thereto may be directed at the particular angle. The specific angle may be determined according to the application. In some instances, a minimal to no angle may be desired, while in other instances a steeper angle may be desired. By way of example and not limitation, the angle 55 of the mounting surface 40 may comprise an angle in the range from 0° to 20°.

The arm member 30 may comprise a support member 60 having a longitudinal axis 70 extending at least substantially perpendicular to the attachment surface 50, a first coupling member 80A on one longitudinal end of the support member 60 and a second coupling member 80B on an opposing longitudinal end of the support member 60. The first and second coupling members 80A, 80B, respectively, extend at least substantially parallel to the attachment surface 50. In some embodiments, the arm member 30 may generally comprise an "H" shape.

The first coupling member 80A may be attached to the attachment surface 50 of the mounting member 20. In some embodiments, the first coupling member 80A may be fixedly attached to the attachment surface 50 by any means known to those of ordinary skill in the art. By way of example and not limitation, the first coupling member 80A may be attached to the attachment surface 50 with one or more fasteners, by welding the first coupling member 80A to the attachment surface 50, etc. In other embodiments, the first coupling member 80A may be attached to the attachment surface 50 by at least one hinge 90A, which is also referred to herein as at least one additional hinge 90A. In some embodiments, the at least one hinge 90A may comprise male and female hinge halves in which a male hinge half is attached to either the attachment surface 50 or the first coupling member 80A and a female hinge half is attached to the other of the attachment surface 50 or first coupling member 80A. As shown in the non-limiting example illustrated in FIG. 2, the first coupling member 80A has two female hinge halves attached thereto and the attachment surface 50 has two male hinge halves attached thereto. The lower portion 95A of the male hinge halves are placed in the female hinge halves.

The second coupling member 80B, positioned on the opposite longitudinal end of the support member 60 from the first coupling member 80A, may include at least one hinge 90B, or at least a portion of a hinge. As shown in FIGS. 1 and 2, the second coupling member 80B may include one or more male hinge halves attached thereto and configured so that the lower portion 95B may fit into a female hinge half (not shown). However, such a configuration is not intended to be limiting. Indeed, the one or more hinge halves attached to the second coupling member 80B may be female hinge halves or a combination of one or more male hinge halves and one or more female hinge halves.

In the embodiments including male and/or female hinge halves on first and second coupling members 80A, 80B configured to be mated to a corresponding hinge half, the halves may be separated by simply lifting one hinge half away from the other corresponding hinge half. Such a configuration makes components easily removed from other components. For example, the mounting member 20 may be easily removed from the arm member 30 by simply lifting the mounting member 20 upward and away from the arm member 30.

The use of one or more hinges 90A and/or 90B provides movement about a vertical axis allowing the mounting member 20 and arm member 30 to swing in a horizontal plane. Furthermore, the hinges 90A, 90B are configured to restrain rotation about a horizontal axis, thereby maintaining the mounting member 20 rigid about a horizontal axis. By limiting movement to rotation about only one or more vertical axes, the position and movement of the flat panel display may be more precisely controlled.

Figure 3:
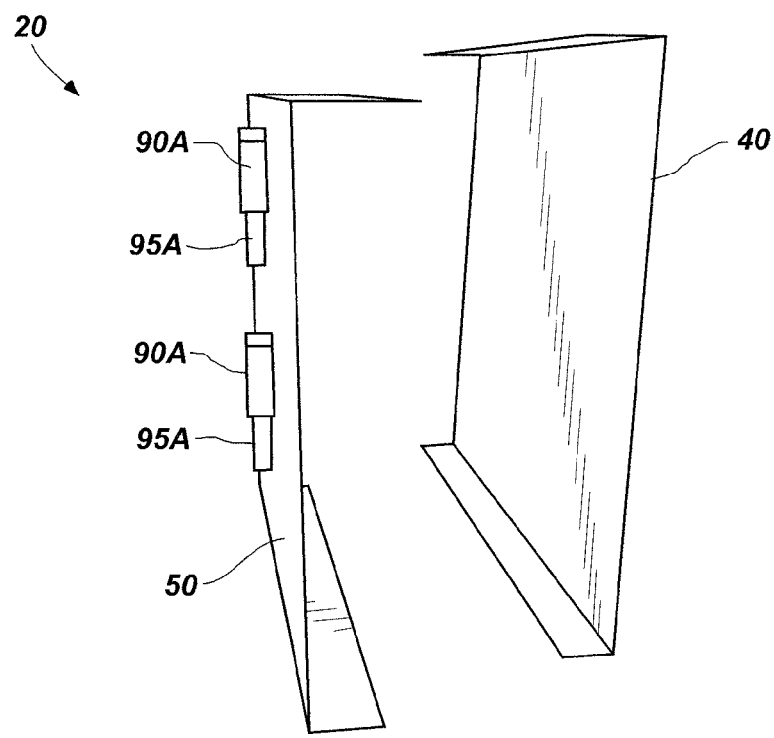
FIG. 3 illustrates an embodiment of a flat panel display mount in which the mounting surface and the attachment surface are laterally offset as well as removable from each other.
Figure 4:
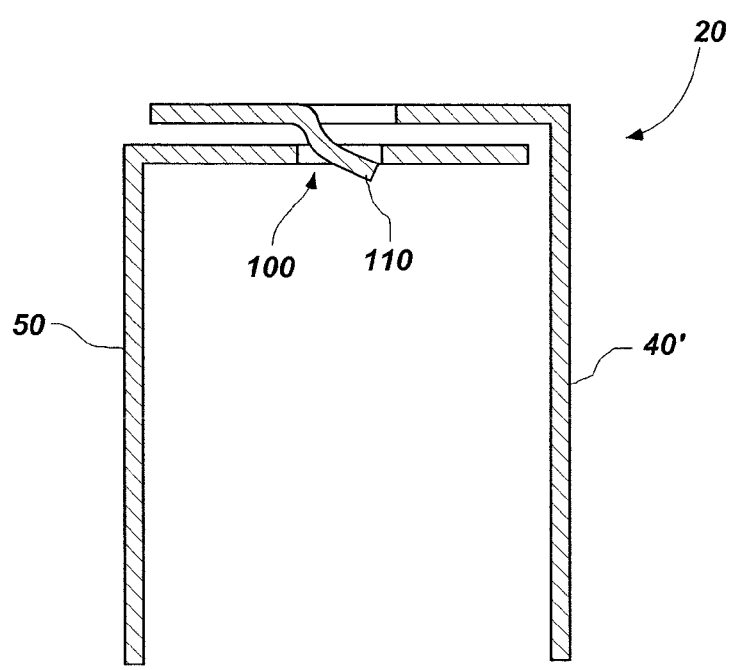
FIG. 4 illustrates a partial cross-sectioned view of a mounting member according to an embodiment configured to include a removable mounting surface.

In some embodiments, the mounting member 20 may comprise a solid or substantially solid member in which the mounting surface 40 and the attachment surface 50 are opposing surfaces of the solid or substantially solid member. In other embodiments, the mounting surface 40 and the attachment surface 50 may be laterally offset from each other such that the two surfaces are separated by a space. FIG. 3 illustrates an embodiment in which the mounting surface 40 and the attachment surface 50 are laterally offset as well as removable from each other. FIG. 4 illustrates a partial cross-sectioned view of mounting member 20 according to an embodiment configured to include a removable mounting surface 40'. The removable mounting surface 40' may be coupled to the attachment surface 50 by fastening the removable mounting surface 40' thereto. By way of example and not limitation, the removable mounting surface 40' may be coupled to the attachment surface 50 with a fastener through horizontal extensions of each surface, such as a nut and bolt, a NUTSERT® and bolt, etc. In some non-limiting embodiments, an aperture 100 may be formed in a horizontal extension of one surface and a finger 110 formed in the horizontal extension of the other surface as shown in FIG. 4. The finger 110 may be placed into the aperture 100 to secure the removable mounting surface 40' and the attachment surface 50 together. With a removable mounting surface 40', the angle 55 described above may be easily adjusted by simply removing a removable mounting surface 40' having one angle 55 and securing another removable mounting surface 40' having a different angle 55.

As illustrated in FIGS. 5A-6B, a flat panel display 120 may be mounted to the mounting member 20, in some embodiments, by any means known to those of ordinary skill in the art and used in conventional display mounts. By way of example and not limitation, the flat panel display 120 may be attached to the mounting member 20 by bolting the flat panel display 120 to the mounting member 20. In other embodiments of the present invention, the flat panel display 120 may be attached to the mounting member 20 in a manner which may provide easy attachment to and removal from the mounting member 20. By way of example and not limitation, the flat panel display 120 may be attached to the mounting member 20 in such a manner so that the flat panel display 120 may be simply lifted off the mounting member 20. Such embodiments may include at least one of a dowel and hooked member configuration and/or a slotted member and hooked member configuration.

Figure 5A:
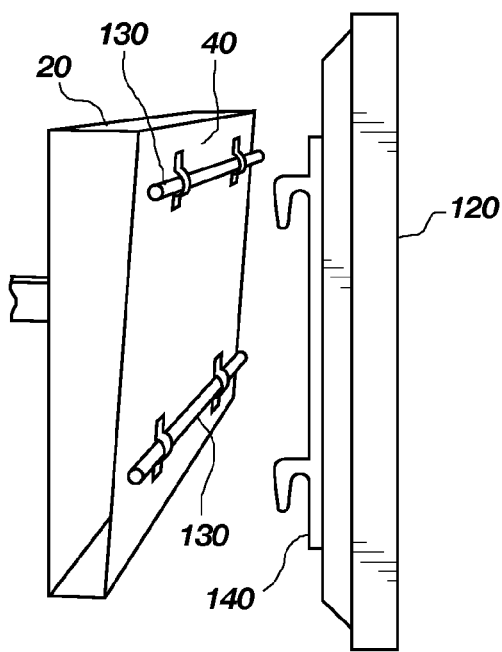
FIGS. 5A and 5B illustrate embodiments for attaching a flat panel display to a mounting member comprising a dowel and hooked member configuration.
Figure 5B:
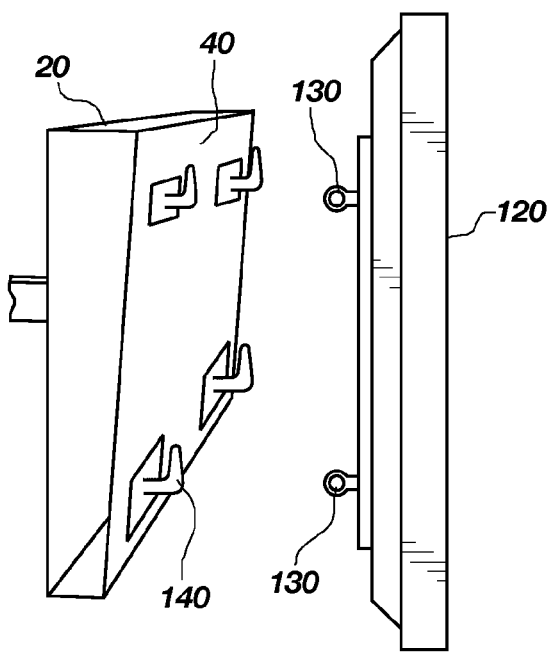

FIGS. 5A and 5B illustrate embodiments of dowel and hooked member configurations. In some embodiments, as shown in FIG. 5A, one or more dowels 130 may be attached on the mounting surface 40 of the mounting member 20. The dowel 130 is positioned offset from the mounting surface 40 to provide sufficient space for a hook or slot to fit at least partially around the dowel 130. A hooked member 140 may be attached to the flat panel display 120 and may comprise a plurality of hooks or slots configured to be associated with each of the one or more dowels 130. The hooked member 140 may comprise a plate-like structure configured for attaching the hooked member 140 to the flat panel display 120 and may comprise a plurality of hooks or slots extending outward and away from the flat panel display 120. FIG. 5B shows a similar, but opposite, configuration in which the one or more dowels 130 are attached on the flat panel display 120 and the one or more hooks or hooked members 140 are attached to the mounting surface 40. In still other embodiments, combinations of the embodiments in FIGS. 5A and 5B may be employed.

Figure 6A:
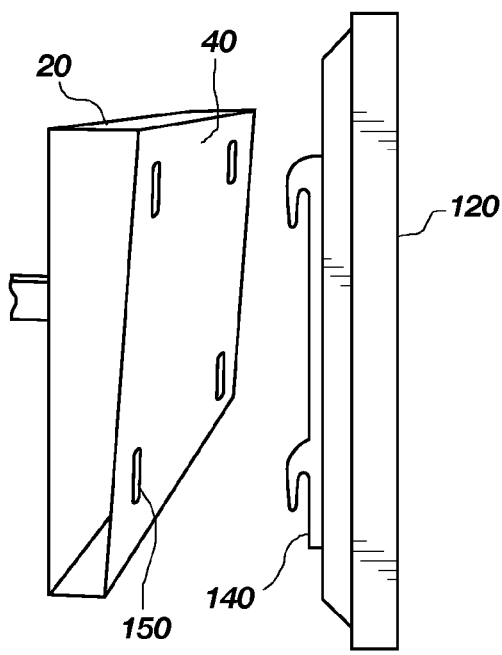
FIGS. 6A and 6B illustrate embodiments for attaching a flat panel display to a mounting member comprising a slotted member and hooked member configuration.
Figure 6B:
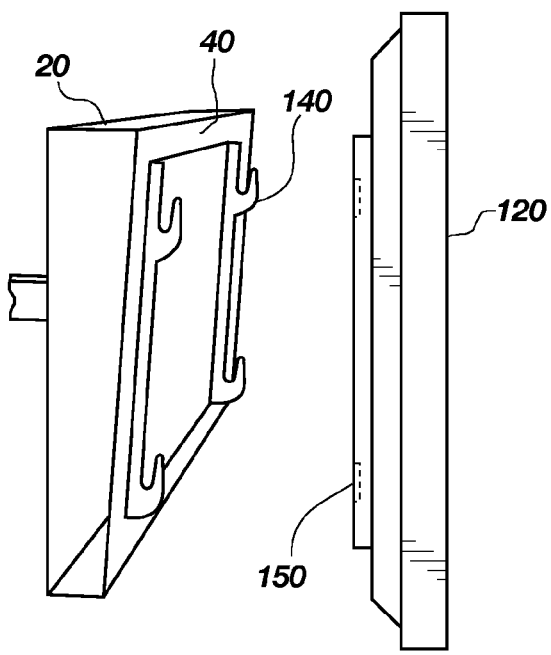

FIGS. 6A and 6B illustrate embodiments of a slotted member and hooked member configuration. In some embodiments, as shown in FIG. 6A, at least one hooked member 140 may be attached to the flat panel display 120 and may comprise a plurality of hooks or slots extending outward and away from the flat panel display 120. A plurality of slots or a slotted member 150 may be positioned in the mounting surface 40 and configured to be associated with each of the hooks or slots in the hooked member 140. In the embodiment shown in FIG. 6A, the slots may comprise a plurality of apertures formed in the mounting surface 40 and aligned relative to corresponding hooks or slots on the hooked member 140 attached to the flat panel display 120. FIG. 6B shows a similar, but opposite, configuration in which the at least one hooked member 140, comprising a plurality of hooks or slots, is attached to the mounting surface 40 of the mounting member 20 and the slotted member 150 is attached to the flat panel display 120. The slotted member 150 in this configuration may comprise a structure configured with one or more slots or apertures formed in a surface offset from the flat panel display 120 to provide sufficient space for the hooks or slots in the hooked member 140 to fit into the slot and between the surface comprising the apertures and the flat panel display 120. In still other embodiments, combinations of the embodiments in FIGS. 6A and 6B may be employed.

A method of forming a flat panel display mount 10 according to at least some embodiments of the present invention may comprise forming the mounting member 20 and the arm member 30 and attaching the mounting member 20 to the arm member 30. The mounting member 20 may then be coupled to the arm member 30. The mounting member 20 may be formed from a rigid material capable of supporting the weight of the flat panel display 120 attached thereto. In some embodiments, the mounting member 20 may comprise a metal or metal alloy material. The mounting member 20 may be formed by conventional methods known to those of ordinary skill in the art, such as, by way of example and not limitation, extrusion, molding, machining, etc. In embodiments in which the mounting surface 40 is removable from the attachment surface 50, each piece may similarly be fabricated by conventional methods and the mounting surface 40 and attachment surface 50 may be coupled together to form the mounting member 20.

The arm member 30 may be formed from a similar rigid material. In some embodiments, the arm member 30 may be formed by coupling the support member 60 and the first and second coupling members 80A, 80B. By way of example and not limitation, the support member 60, the first coupling member 80A and second coupling member 80B may comprise a 1"×2"×0.090 steel rectangle tube welded into the previously described "H" shape. At least one hinge 90B (or portion of a hinge) may be attached to at least the second coupling member 80B.

Figure 7:
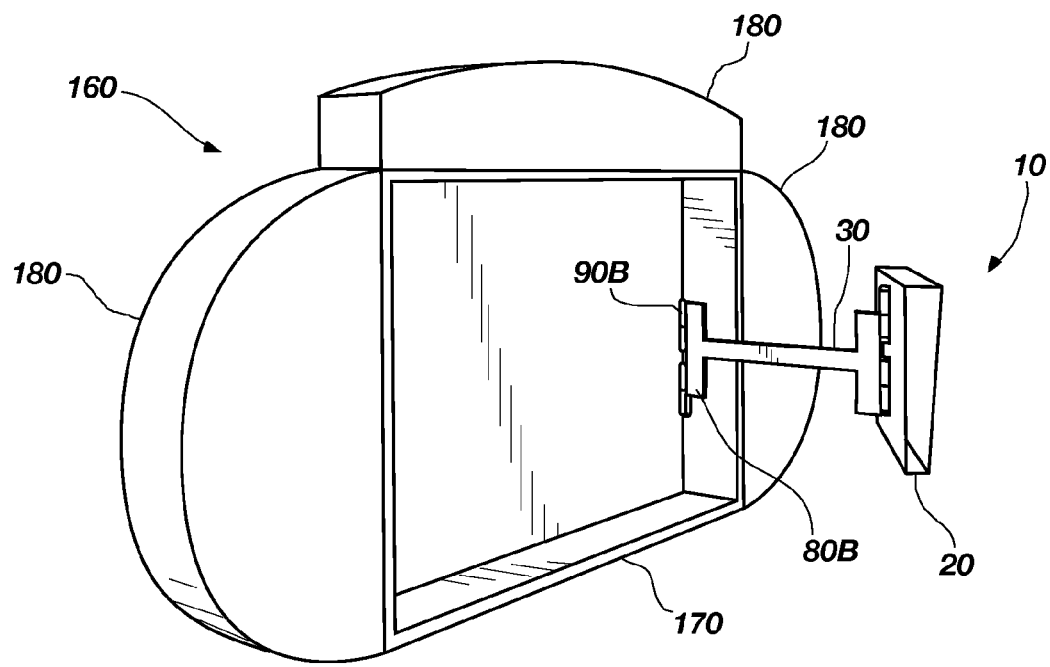
FIG. 7 shows a sign display including a flat panel display mount according to an embodiment of the invention.

Various embodiments of the flat panel display mount 10 may be employed for use in a variety of sign display embodiments. FIG. 7 shows a sign display 160 including a flat panel display mount 10 according to an embodiment of the invention. The sign display 160 may comprise a frame structure or housing 170 configured to receive at least one flat panel display at least partially therein. The sign display 160 may include at least one sign panel 180 attached to the housing 170. In some embodiments, the at least one sign panel 180 may be removably attached to the housing 170 so that the sign theme, information thereon, the graphics, presentation, or combinations thereof may be changed as desired. The sign display 160 may also include a flat panel display mount 10 attached to the housing. The flat panel display mount 10 may be configured according to any embodiment of the present invention. The at least one hinge 90B attached to the second coupling member 80B may be used to couple the flat panel display mount 10 to the housing 170. As described above, in some embodiments, the second coupling member 80B may comprise one or more hinge halves, male or female. A corresponding hinge half may be attached to the housing 170 to receive each of the one or more hinge halves on the second coupling member 80B. Such a configuration may allow the arm member 30 to be easily attached to and removed from the housing 170.

Figure 8:
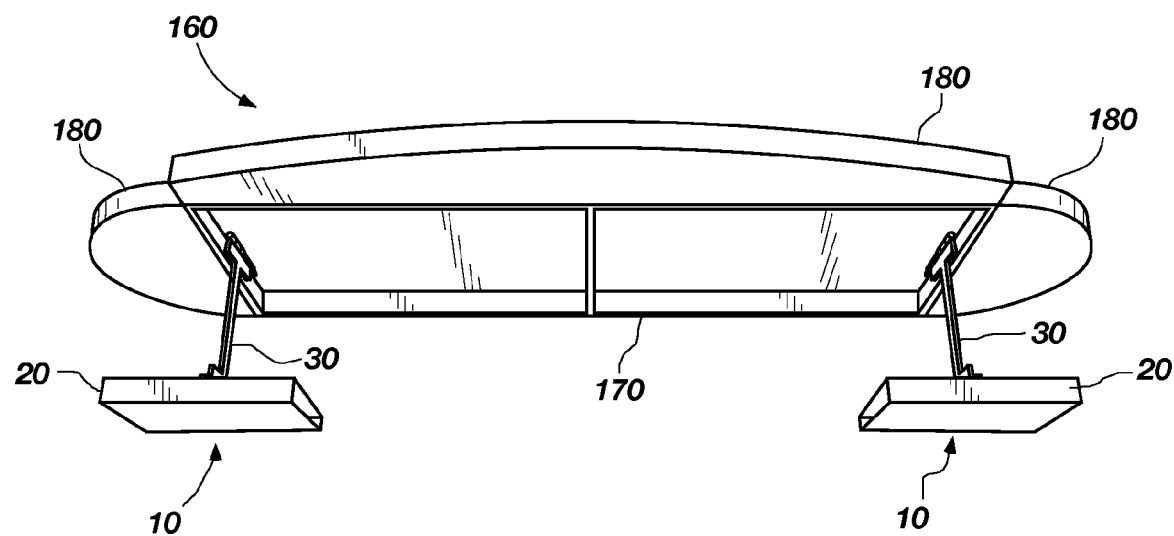
FIG. 8 shows a sign display configured to include two flat panel displays therein according to one embodiment.

FIG. 8 shows a sign display 160 configured to include two flat panel displays therein. In such an embodiment, a flat panel display mount 10 may be positioned and attached to the housing 170 for each of the flat panel displays. Although FIG. 8 shows only an example of an embodiment in which the flat panel displays are positioned side-by-side, other embodiments may be configured so that the flat panel displays are positioned back-to-back (i.e., so one faces toward one side of the sign display 160 and the other faces toward the opposing side of the sign display 160), top-to-bottom (i.e., placed vertically one above another), or combinations thereof. Furthermore, the sign is not limited to two flat panel displays. Instead, a plurality of flat panel displays may be employed in a single sign display 160 according to various embodiments of the present invention.

Because the flat panel display mount 10 is hinged at least between the housing 170 and the second coupling member 80B, the mounting member 20, and any flat panel display attached thereto, may be rotated about at least a vertical axis extending through the center of the at least one hinge 90B. Such rotation allows the flat panel display to be rotated outward and away from the housing 170 to provide access to any components or devices located in the housing 170 behind the flat panel display, as well as to the back side of the flat panel display itself. While allowing movement in a horizontal plane and about one or more vertical axis, the flat panel display mount 10 maintains the flat panel display substantially rigid about any horizontal axis.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A flat panel display mount, comprising:
 a mounting member comprising a mounting surface on one side configured to receive a flat panel display and an attachment surface on an opposing side thereof, the attachment surface being oriented along a vertical plane and the mounting surface being fixedly and non-adjustably oriented along a plane that is nonparallel to the vertical plane;
 an arm member comprising a support member having a longitudinal axis extending at least substantially perpendicular to the attachment surface, a first coupling member on one longitudinal end of the support member, and a second coupling member on an opposing longitudinal end of the support member, each coupling member extending at least substantially parallel to the attachment surface, wherein the first coupling member is attached to the mounting member; and at least one hinge disposed on the second coupling member configured to rotate the arm member about a vertical axis and maintain the mounting member rigid about a horizontal axis.

2. The flat panel display mount of claim 1, wherein the mounting surface is configured to be removed from the attachment surface.

3. The flat panel display mount of claim 1, wherein the mounting surface extends at a fixed angle relative to the attachment surface, the fixed angle comprising an angle between 1° and 20°.

4. The flat panel display mount of claim 1, wherein the mounting surface further comprises at least one mounting configuration selected from the list consisting of at least one dowel configured to receive at least one hook attached to the flat panel display, at least one hook configured to receive at least one dowel attached to the flat panel display, and at least one hook configured to receive at least one slot attached to the flat panel display.

5. The flat panel display mount of claim 1, wherein the first coupling member attached to the mounting member is attached by at least one additional hinge configured to rotate the mounting member about the vertical axis.

6. The flat panel display mount of claim 5, wherein the first coupling member attached to the mounting member is removably attached by the at least one additional hinge.

7. The flat panel display mount of claim 1, wherein:
the mounting member comprises at least one mounting hinge half coupled thereto, the at least one mounting hinge half comprising at least one of a female hinge half and a male hinge half comprising a portion configured to be cooperatively mated with a female hinge half; and
the first coupling member includes at least one coupling hinge half coupled thereto, the at least one coupling hinge half comprising at least one of a female hinge half and a male hinge half comprising a portion configured to be cooperatively mated with a female hinge half, and wherein the at least one coupling hinge half of the first coupling member is cooperatively mated with the at least one mounting hinge half of the mounting member.

8. The flat panel display mount of claim 7, wherein the mounting surface of the mounting member is angularly offset from the attachment surface of the mounting member.

9. The flat panel display mount of claim 8, wherein the mounting surface is configured to be removed from the attachment surface.

10. The flat panel display mount of claim 3, wherein the fixed angle comprises an angle between 1° and 20° from the vertical plane.

11. The flat panel display mount of claim 7, wherein the mounting member is configured to receive the flat panel display with a dowel and hooked member combination.

12. The flat panel display mount of claim 7, wherein the first coupling member is attached to the mounting member by at least one additional hinge configured to rotate the mounting member about a vertical axis.

13. The flat panel display mount of claim 12, wherein the first coupling member attached to the mounting member is removably attached by the at least one additional hinge.

14. The flat panel display mount of claim 12, wherein the at least one additional hinge attaching the first coupling member to the mounting member is configured to maintain the mounting member at least substantially rigid about a horizontal axis.

15. The flat panel display mount of claim 7, wherein the at least one coupling hinge half of the first coupling member that is cooperatively mated with the at least one mounting hinge half of the mounting member includes a male hinge half comprising a protrusion, the protrusion of the male hinge half cooperatively mating with a female hinge half of the at least one mounting hinge half of the mounting member to maintain the mounting member at least substantially rigid about a horizontal axis.

16. A modular sign, comprising:
a housing configured to receive at least one flat panel display within the housing;
at least one sign panel attached to the housing; and
a flat panel display mount attached to the housing, comprising:
a mounting member configured to receive a flat panel display thereon at a fixed and non-adjustable angle relative to a vertical plane; and
an arm member comprising a coupling member on each end of a longitudinally extending support member, one of the coupling members attached to the mounting member and the other coupling member attached within the housing with at least one hinge, the at least one hinge positioned to dispose the mounting member within the housing when the arm member is in a retracted position and configured to rotate the arm member about a vertical axis to rotate the mounting member away from the housing.

17. The modular sign of claim 16, wherein the housing is sized and configured to receive a plurality of flat panel display mounts within the housing.

18. The modular sign of claim 17, wherein the plurality of flat panel display mounts are positioned to orient a plurality of flat panel displays in a configuration comprising at least one of side-by-side, back-to-back, and top-to-bottom.

19. The modular sign of claim 16, wherein the at least one sign panel is removably attached to the housing.

20. The modular sign of claim 16, wherein the mounting member of the flat panel display mount comprises a mounting surface on one side thereof configured to receive the flat panel display and an attachment surface on an opposing side of the mounting member and laterally offset from the mounting surface, the mounting surface being angularly offset from the attachment surface.

21. The modular sign of claim 20, wherein the mounting surface is configured to be removed from the attachment surface.

22. The modular sign of claim 20, wherein the mounting surface extends vertically at an angle comprising an angle between 1° and 20° from the vertical axis.

23. The modular sign of claim 16, wherein the coupling member attached to the mounting member is attached by at least one hinge configured to rotate the mounting member about a vertical axis.

24. The modular sign of claim 23, wherein the coupling member attached to the mounting member is removably attached by the at least one hinge.

25. The modular sign of claim 23, wherein the at least one hinge attaching the coupling member to the mounting member is configured to maintain the mounting member at least substantially rigid about a horizontal axis.

26. The flat panel display mount of claim 16, wherein the other coupling member is removably attached to the housing with the at least one hinge.

27. The modular sign of claim 26, wherein the at least one hinge attaching the other coupling member to the housing is configured to maintain the arm member at least substantially rigid about a horizontal axis.

28. A method of forming a flat panel display mount, comprising:

forming a mounting member configured to receive a flat panel display thereon at a fixed angle;
forming an arm member comprising a coupling member on each end of a longitudinally extending support member;
attaching one of the coupling members to the mounting member;
attaching at least one hinge on a coupling member on an opposing end of the longitudinally extending support member from the coupling member attached to the mounting member; and
permanently restricting movement of the mounting member to rotation solely about a vertical axis.

29. The method of claim 28, wherein forming a mounting member comprises:
   forming a mounting surface configured to extend vertically at the fixed angle;
   forming an attachment surface; and
   coupling the mounting surface to the attachment surface.

30. The method of claim 28, wherein attaching one of the coupling members to the mounting member comprises attaching the one of the coupling members to the mounting member with at least one hinge comprising engaging a protrusion formed on a first hinge half of the at least one hinge with an aperture formed in a second hinge half of the at least one hinge along a vertical axis.

31. The method of claim 28, wherein attaching one of the coupling members to the mounting member comprises removably attaching the one of the coupling members to the mounting member with at least one hinge.

* * * * *